United States Patent [19]

Parnell et al.

[11] 4,314,783
[45] Feb. 9, 1982

[54] QUICK RELEASE LOAD SECUREMENT DEVICE

[75] Inventors: Lyle J. Parnell, Wheaton; James L. Fabio, Crystal Lake, both of Ill.

[73] Assignee: MacLean-Fogg Company, Mundelein, Ill.

[21] Appl. No.: 38,643

[22] Filed: May 14, 1979

[51] Int. Cl.³ .................. B60P 7/10; B61D 3/16; B61D 45/00

[52] U.S. Cl. .................. 410/34; 24/230 AL; 254/247; 410/38; 410/100; 410/103

[58] Field of Search ...... 24/230 A, 230 AK, 230 AL; 254/247; 410/32, 34, 38, 40, 100, 103

[56] References Cited

U.S. PATENT DOCUMENTS

| | | | |
|---|---|---|---|
| 2,628,397 | 2/1953 | Olson | 410/103 |
| 2,773,700 | 12/1956 | Lassluell | 410/103 |
| 3,140,850 | 7/1964 | Packard | 410/103 X |
| 3,348,870 | 10/1967 | Zern | 24/230 AL X |
| 3,760,467 | 9/1973 | Lohr | 24/230 AL |
| 3,804,028 | 4/1974 | O'Leary et al. | 410/40 |
| 4,143,600 | 3/1979 | Hlinsky | 410/103 |

Primary Examiner—Joseph F. Peters, Jr.
Assistant Examiner—Howard Beltran
Attorney, Agent, or Firm—Mason, Kolehmainen, Rathburn & Wyss

[57] ABSTRACT

A device for quickly releasing tension in a load securement element such as high tension banding used to secure loads to railroad flat cars. The device includes a tubular housing within which a slide member is movable between set and released positions. Attachment devices for connection to the band or element and to a support are carried by the housing and slide member and are separated when the slide member moves from the set to the released position. A lock pin carried in the slide member engages the hosuing for locking the slide member in the set position, and also for guiding the movement of the slide member in the housing. A release element on the housing is readily movable in the transverse direction, as by striking with a hammer, to release the lock pin and permit the slide member to move from the set position. A bright colored surface on the slide member visible through a window in the housing indicates the position of the slide member. The slide member may include compressible resilient material to maintain tension in the securement element or band.

7 Claims, 14 Drawing Figures

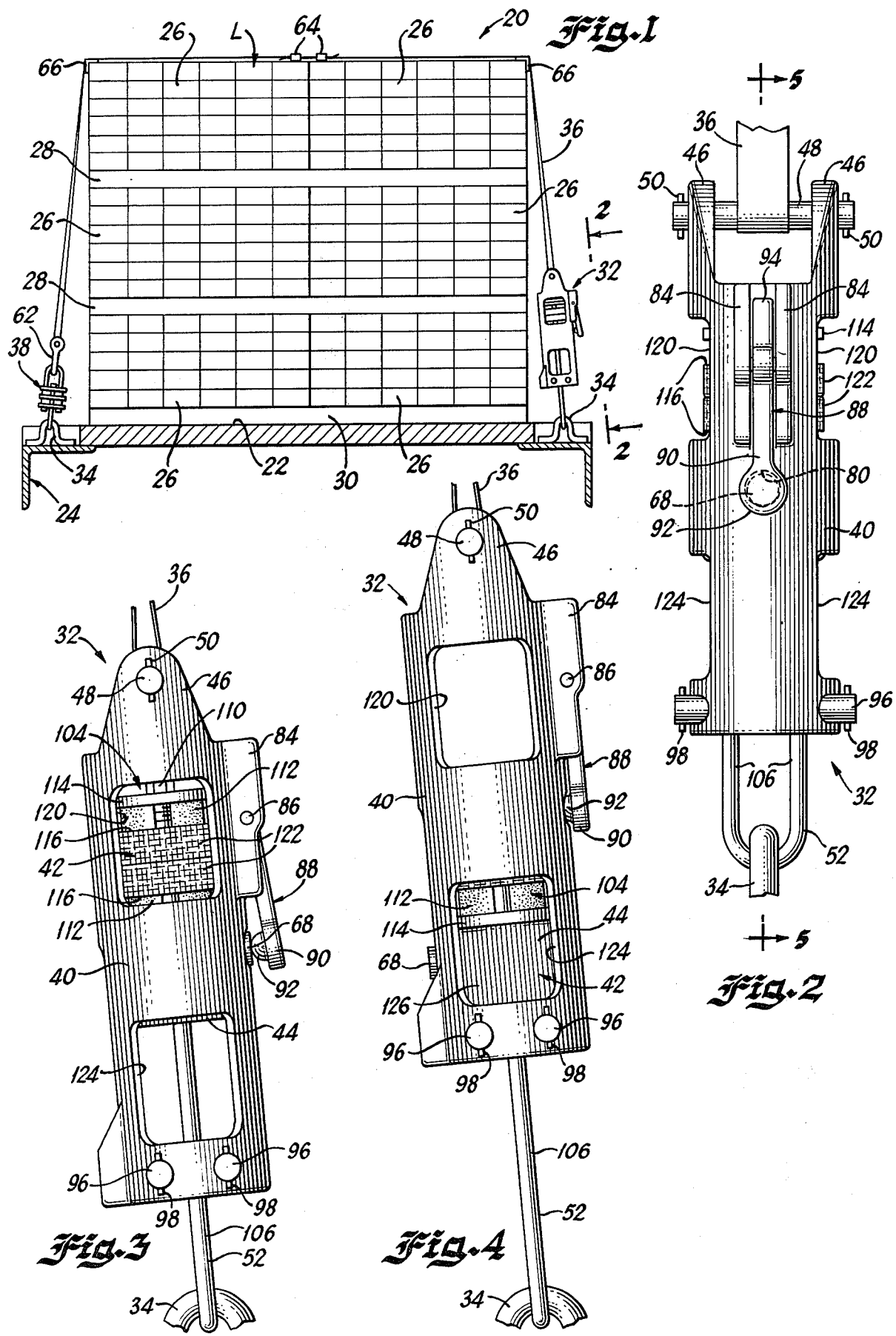

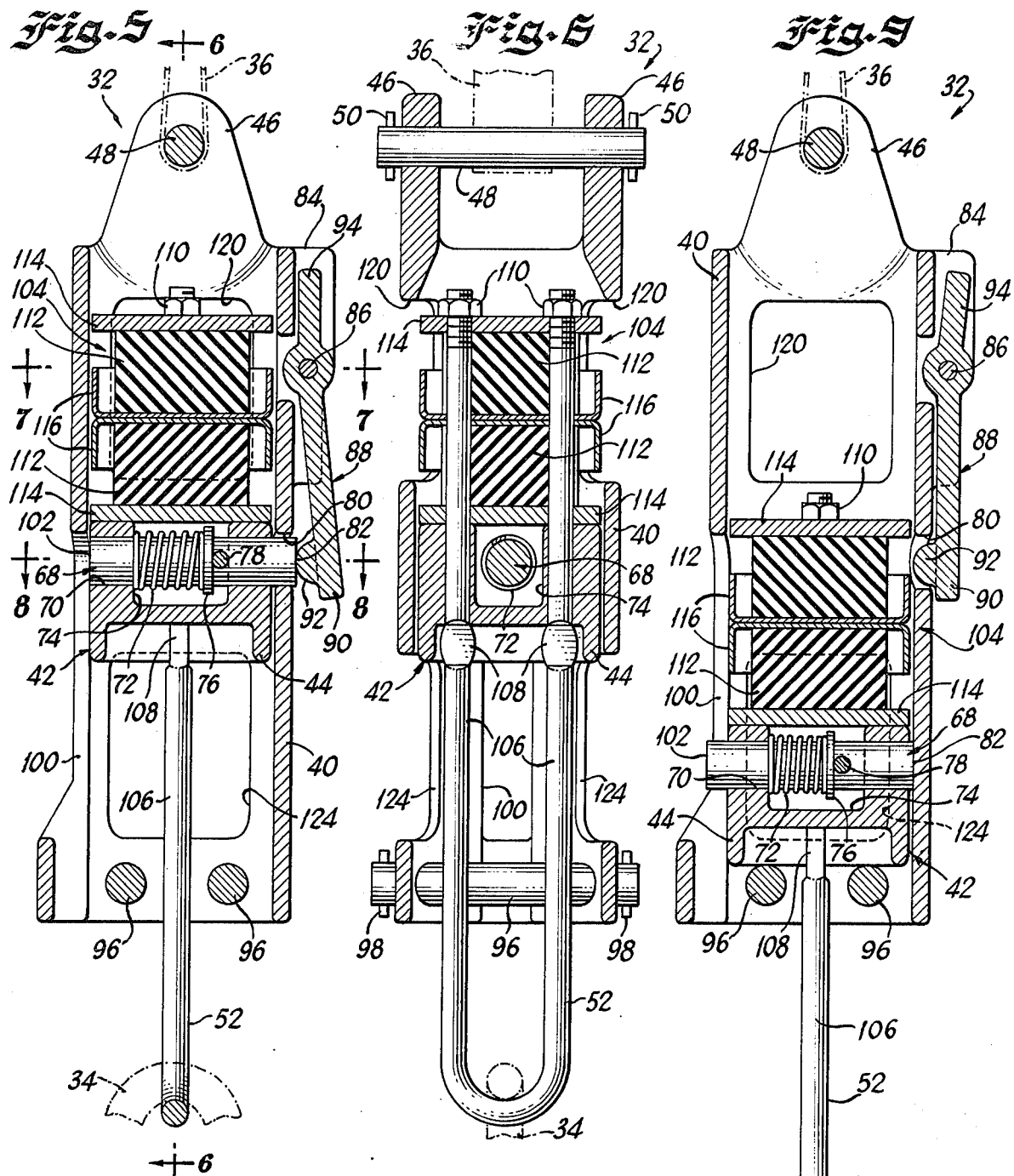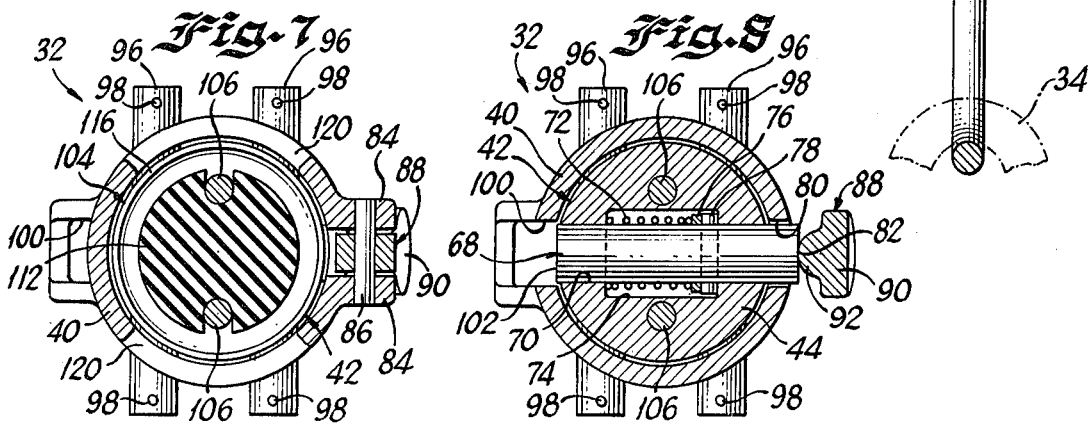

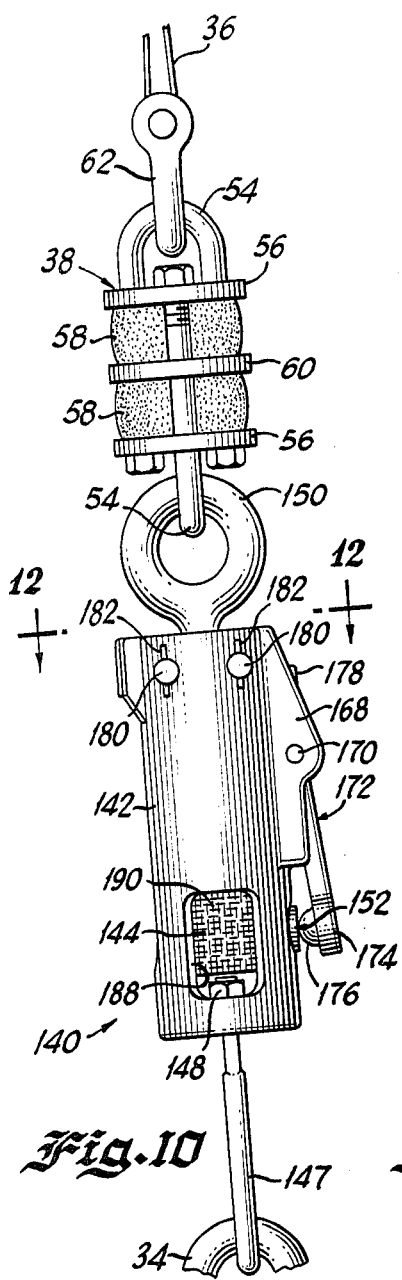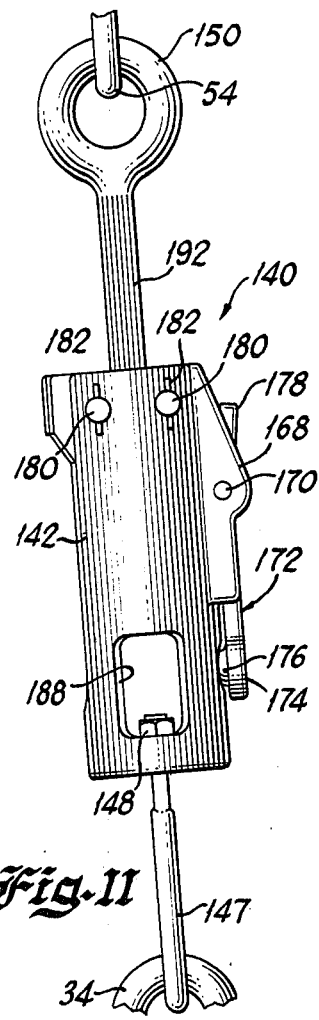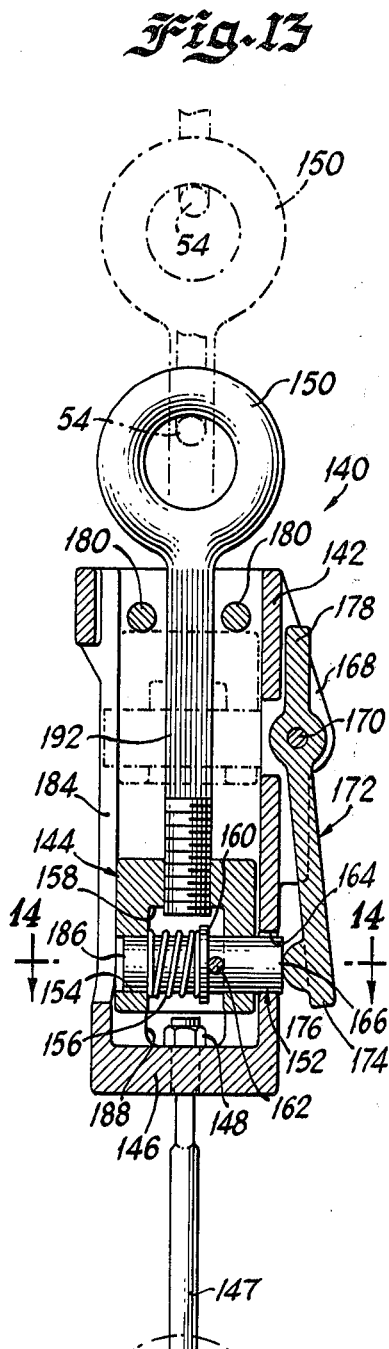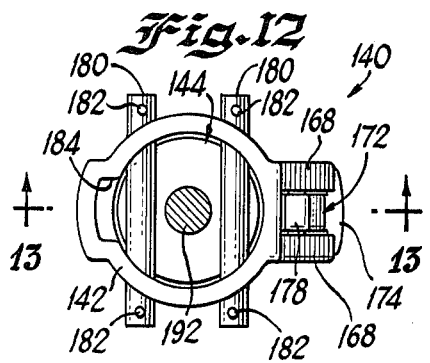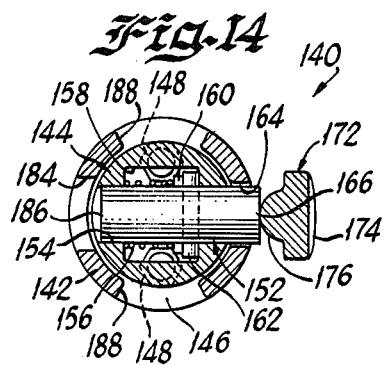

QUICK RELEASE LOAD SECUREMENT DEVICE

The present invention relates to improvements in quick release load securement devices.

Loads are frequently secured to vehicles by elongated, tensioned and flexible securement elements such as bands, chains or other similar elements. One example, in connection with which the present invention is described, is the use of high tension steel bands for securing material such as packaged lumber to a railroad flat car. When used for this purpose, the banding is subjected to high tension forces to assure that the load is securely held in position on the car. When the load is to be removed from the car, the bands are removed by cutting. However, cutting of the bands while under high tension is hazardous because the severed band segments can recoil with sufficient force to cause serious injury. In order to overcome this problem there has developed a necessity for quick release load securement devices capable of relieving tension in the bands before the bands are cut.

Quick release load securement devices used in the past have included toggles normally used with a separate compression spring unit or compression device for maintaining tension in the load securing bands. Such toggle devices are typically connected between a support and the band and are operable to a set position, in which the band is tensioned, and a released position, in which the tension in the band is released. A locking element has been used with such toggle devices to prevent operation of the toggle from the set to the released conditions until the locking element is moved to an inactive position.

Difficulties of various types have been encountered with the toggle type quick release load securement devices used in the past. In securing a load, inconvenience results because a number of distinct operations or movements are required to operate such devices and lock them in the set condition. Furthermore, the release of such devices has been difficult and inconvenient. In addition, the use of a separate compression element along with the load securement device may in some situations be undesirable.

Among the important objects of the present invention are to provide improvements in quick release load securement devices; to provide a load securement device which is easily and automatically operable from the released to the set and locked condition; to provide a device which is operated from the set to the released condition in an extremely simple manner; to provide a device which includes axially slidable elements rather than toggle elements; to provide a device including improved structure for guiding and for locking the elements of the device; to provide a device including an easily perceived indication of the condition of the device; and to provide quick release load securement devices overcoming the problems encountered with such devices used in the past.

An additional object achieved with an embodiment of the present invention is to provide a quick release load securement device including resilient structure for maintaining tension without the use of a separate spring or compression unit or the like.

In brief, in accordance with the above and other objects of the invention, there is provided a quick release load securement device for selectively maintaining or releasing tension in a load securement element. The device includes an elongated generally tubular housing. A slide member is movable axially within the housing between a set position and a released position. One attachment member is carried by the housing and another attachment member is carried by the slide member. The attachment members extend from opposite ends of the device for connecting the device between a support and a load securement element.

In accordance with one feature of the invention, a lock element is supported by the slide and is engageable with a first recess in the housing for automatically locking the slide in the set position. A release lever carried by the housing overlies the recess in the housing and can be moved as by striking with a hammer to push the lock element from the recess and permit the slide member to move to the released position.

In accordance with another feature of the present invention, the lock element is engageable not only with the first recess for locking the slide member, but alternatively with a second elongated recess in the housing for guiding the sliding movement of the slide member between the released and set positions.

Another feature of the present invention, incorporated in one embodiment of the invention, resides in providing the slide member with resilient means coupled to the corresponding attachment member. In this embodiment, the resilient means renders unnecessary a separate compression unit or spring for maintaining tension in the load securement element attached to the quick release device.

In accordance with yet another feature of the present invention, there is provided a bright colored surface covering at least a portion of the slide member. The housing is provided with a window or aperture aligned with the slide member when the slide member is in the set position. Consequently, visual inspection of the quick release device readily reveals whether the device is in the set or the released condition.

The invention together with the above and other objects and advantages thereof may be best understood from the following detailed description of the embodiments of the invention shown in the drawings, wherein:

FIG. 1 is a vertical sectional view of a railroad flat car load securement system including a quick release load securement device constructed in accordance with the present invention;

FIG. 2 is a side view of the quick release load securement device taken from the line 2—2 of FIG. 1 and shown in an enlarged scale;

FIG. 3 is another side view of the device, viewed from the left in FIG. 2;

FIG. 4 is a view similar to FIG. 3 illustrating the device in the released rather than the set condition;

FIG. 5 is a sectional view on an enlarged scale taken along the line 5—5 of FIG. 2;

FIG. 6 is a sectional view taken along the line 6—6 of FIG. 5;

FIG. 7 is a sectional view taken along the line 7—7 of FIG. 5;

FIG. 8 is a sectional view taken along the line 8—8 of FIG. 5;

FIG. 9 is a view similar to FIG. 5 but illustrating the device in the released rather than the set condition;

FIG. 10 is a side view of a quick release load securement device comprising another embodiment of the invention and illustrated together with a separate compression device;

FIG. 11 is a view similar to part of FIG. 10 illustrating the device of FIG. 10 in the released rather than the set condition;

FIG. 12 is a sectional view of the device of FIG. 10 taken along the line 12—12 of FIG. 10;

FIG. 13 is a vertical sectional view on an enlarged scale of the device of FIG. 10, taken along the line 13—13 of FIG. 12; and FIG. 14 is a sectional view taken along the line 14—14 of FIG. 13.

Having reference now to the drawings and initially to FIG. 1, there is illustrated a load securement system generally designated as 20 securing a load L to the deck 22 of a railroad flat car 24. The load L is but one example of the types of loads with which the system 20 may be used, and comprises packages 26 of lumber, with interposed separators 28, placed atop floor bearing pieces 30.

The load securement system 20 includes a quick release load securement device designated as a whole as 32 and constructed in accordance with the principles of the present invention. The device 32 is connected between a support in the form of a floor anchor 34 and a load securing element in the form of a high tension steel band 36. At the opposite side of the car, the band 36 is connected to a compression unit 38 which in turn is connected to a floor anchor 34. While the principles of the present invention are described in connection with the railroad car load securement system 20 including band 36, it should be understood that principles of the present invention are applicable to other types of load securement systems and elements.

Proceeding now to a description of the quick release load securement device 32 of the present invention, and with reference to FIGS. 2-9, the device 32 includes a housing 40 within which is received a slide assembly generally designated as 42 and including a slide member 44. As best seen in FIG. 8, the slide assembly 42 and the slide member 44 are complementary in shape to the inner surface of the wall of the housing 40 to the end that the slide assembly 42 is slidable in an axial direction within the housing 40.

At its upper end (as shown in the drawings) the housing 40 is provided with a pair of ears 46 supporting a transversely extending attachment member in the form of a pin or rod 48 held in position by retaining pins 50. Extending from the lower or opposite end of the housing 40 is a second attachment member in the form of a U-shaped bail or bracket 52 supported by the slide assembly 42.

For use in the load securement system 20, the device 32 is permanently assembled to the railroad car 24 by welding the floor anchor 34 to the car with the bail 52 connected to the anchor. In a similar manner, the compression unit 38 is assembled to the welded second floor anchor 34.

The compression unit 38 is of conventional construction and includes a pair of U-shaped bail members 54 (see also FIG. 10) each having its legs connected to a generally circular end plate 56. Between the end plates are stacked a pair of resilient compressible rubber inserts 58 sandwiched about a separator plate 60. When the bails 54 are pulled in opposite directions, compression forces are applied to the inserts 58, and the compression unit 38 functions essentially as a heavy spring. The compression unit 38 is used in combination with a clevis and pin device 62 for connection of the compression unit 38 to the band 36.

In order to permit quick release of tension in a securement element such as the band 36, the slide assembly 42 is movable within the housing 40 between a set position shown in FIGS. 1-3 and 5-8 of the drawings and a released position shown in FIGS. 4 and 9. As is readily apparent from a comparison of these figures, the axial distance separating the attachment members 48 and 52 is smaller in the set position than in the released position.

In the use of the quick release load securement device 32 to secure a load, the slide assembly 42 is initially locked in the set position. The band 36 is then extended over the load L in a double layer having loops at its ends, which loops are engaged with the attachment member 48 of the device 32 and with the clevis and pins 62 of the compression unit 38. The band is secured in a condition of substantial tension by crimped connectors 64. The pin or rod 48 may carry a roller sleeve if desired to facilitate tightening of the band. Edge protectors 66 may be interposed between the band 36 and the load to prevent the band from deforming the load and losing tension and/or damaging the load.

To release the load from the securement system 20, the band 36 is cut. If this is done with the band under substantial tension, recoil of the band creates a hazardous condition. This hazard is avoided by movement of the slide assembly 42 from the set position to the released position thereby to slacken the band before it is cut.

In accordance with a feature of the invention, the load securement device 32 is easily placed in its set condition by a simple axial sliding movement of the slide assembly 42 within the tubular housing 40, and is automatically locked in this set position. More specifically, a lock pin 68 is supported for transverse sliding movement in a corresponding opening 70 extending through the slide member 44. A spring 72 (FIGS. 5, 8 and 9) disposed within a cavity 74 in the slide member 44 bears against a spring retainer 76 on the lock pin 68. The spring 72 continually urges the lock pin toward a locked position (FIGS. 5 and 8) wherein a stop member 78 engages the wall of cavity 74.

The wall of the tubular housing 40 is provided with a lock aperture 80 sized to receive a first end 82 of the lock pin 68. When the slide assembly 42 including the slide member 44 is moved by a simple axial sliding movement within the housing 40 to the set position, the end 82 of the lock pin 68 automatically snaps into the lock aperture 80 under the influence of the spring 72 securely and automatically to lock the device 32 in the set condition.

Another feature of the present invention resides in the provision of structure permitting easy and convenient release of the device 32 from the set condition. The housing 40 is provided with a pair of flanges 84 supporting a pivot pin 86 upon which is mounted a release lever 88. Lever 88 includes an operating portion 90 overlying the lock aperture 80 in the housing 40. A protrusion or nose portion 92 carried by operating lever portion 90 is aligned with the lock aperture 80 and protrudes a distance approximately equal to the wall thickness of the housing 40. In order to maintain the operating lever portion 90 adjacent the lock aperture 80, the release lever 88 also includes a keeper portion 94 limiting the rotation of the lever 88 about the pivot pin 86.

When it is desired to release the load securement device 32 in order to cut banding maintained in tension by the device 32, the lever 88 is rotated in the clockwise direction as viewed in FIGS. 5 and 9 to move the lock pin 68 from the aperture 80. This can be readily accomplished, for example by striking the operating portion 90 of the release lever 88 with a hammer or other tool. When the end 82 of the lock pin 68 is moved clear of the lock aperture 80 by the nose portion 92 of the lever 88, the tension in the band 36 or other securement element causes the slide assembly 42 to move away from the set position and toward the released position.

The released position of the device 32 is illustrated in FIGS. 4 and 9. In order to prevent the slide assembly 42 and slide member 44 from being removed from the housing 40, there are provided a pair of stop members taking the form of pins or rods 96 held by retaining pins 98 and engaged by the slide member 44 in the released position.

In accordance with the invention, the lock pin 68 cooperates with the housing 40 not only automatically to lock the device 32 in the set position, but also to guide the sliding movement of the slide member 44 between positions. For this purpose, the housing 40 is provided with an elongated slot or recess 100 generally diametrically opposed from the lock aperture 80. The recess 100 is aligned with a second end 102 of the lock pin 68. When the lock pin is moved in opposition to the force of spring 72 from the lock aperture 80 and when the slide member 44 leaves the set position illustrated in FIG. 5, the end 82 of the lock pin bears against the inside wall of the housing 40 while the end 102 enters the guide recess 100. Thus, as the slide member 44 moves between the set position and the released position, the slide member 44 is guided in its sliding motion so that it cannot rotate and so that the end 82 of the lock pin 68 remains in alignment with the lock aperture 80.

A compression or spring unit such as the compression unit 38 described above is normally used with a load securement element such as the band 36 in order to assure that substantial tension is maintained in the band despite factors such as compacting or settling of the load, stretching of the band, or the like. In railroad flat car high tension band systems such as the system 20, normally two spring or compression units are installed, one on each side of the load. In accordance with a feature of the invention and in order to avoid the necessity for use of two distinct compression units 38 with each band 36, the device 32 is provided with a compression structure generally designated as 104. Consequently, the device 32 itself provides the necessary compression characteristics at one side of the load without the use of a separate compression unit.

More specifically, opposed legs 106 of the bail 52 slidably extend through openings provided in the slide member 44 for a predetermined distance limited by enlarged portions 108 on each leg 106. Captured between fasteners 110 at the ends of the legs 106 and the slide member 44 are a pair of compression inserts 112 formed of a flexible, resilient and elastomeric material such as rubber. The inserts 112 are flanked by a pair of spacer and compression plates 114 and are separated by a pair of cup-shaped container or cage members 116.

When the securement device 32 is subjected to tension, the inserts 112 are capable of resilient deformation in the manner of a heavy spring. The bail legs 106 slide through the slide member 144 as the inserts are compressed. Consequently, the device 32 performs not only the function of a quick release device but also the function of a compression unit, and this is achieved in a single assembly. Moreover, the compression structure 104 is operable in either the set condition or the released condition of the load securement device 32.

In the use of the quick release securement device 32, it is desirable that the person installing the load securement system 20 be able readily to determine whether or not the device 32 is in its set condition. In accordance with a feature of the present invention there is provided an easily perceived visual indication of the condition of the device 32.

More particularly, and as best seen in FIGS. 3 and 4, the housing 40 is provided with a pair of oppositely directed windows 120 aligned with the slide assembly 42 when the load securement device 32 is in the set condition. The cup-shaped containers 116 are clearly visible through the windows 120 when the slide assembly 42 is in its set position. As indicated by the color lining in FIG. 3, the outer peripheral surfaces 122 of the members 116 are brightly colored in yellow so that a visual indication of the set condition is easily perceived through the windows 120.

When the slide assembly 42 is not in the set condition (FIG. 4), the yellow surfaces 122 are not visible through the windows 120 and this provides an indication that the device 32 is not in the set condition. A further indication is achieved by providing the housing 40 with an additional pair of windows 124 which are aligned with the slide assembly 42 in its released condition. More specifically, as seen in FIG. 4, when the slide assembly 42 is in the released position, the outer peripheral surface 126 of the slide member 44 is visible through the windows 124. As indicated by the color lining in FIG. 4, the surface 126 is brightly colored in red to provide an easily perceived indication of the released condition of the device 32.

Having reference now to FIGS. 10–14, there is illustrated a quick release load securement device generally designated as 140 and comprising an alternative embodiment of the present invention. The device 140, while similar in many respects to the device 32 described above, does not include a self-contained compression structure but rather is intended for use in conjunction with a separate compression unit 38 between a support such as a floor anchor 34 and a load securement element such as a steel band 36.

The quick release load securement device 140 includes a tubular housing 142 within which is received a slide member 144. As best seen in FIG. 14, the slide member 144 is complementary in shape to the inner surface of the wall of the housing 142 to the end that the slide member 144 is slidable in an axial direction within the housing 142.

A lower end wall 146 of the housing 142 supports an attachment member in the form of a U-shaped bracket or bail 147 attached to the wall 146 by fasteners 148. Extending from the upper or opposite end of the housing 142 is a second attachment member in the form of an eye bolt 150 attached as by threading to the slide member 144.

For use in a load securement system, the bail 147 is connected to a floor anchor 34 welded to a rail car deck. The bolt 150 is connected to a compression unit 38 of the type described above, and the clevis and pin device 62 of the compression unit 38 is interconnected with a tensioned steel band 36.

In order to permit quick release of tension in a securement element such as the band 36, the slide member 144 is movable within the housing 142 between a set position shown in FIGS. 10 and 12–14 and a released position shown in FIG. 11 and in broken lines in FIG. 13. As is readily apparent from a comparison of these figures, the axial distance separating the attachment members 147 and 150 is smaller in the set position than in the released position.

In accordance with a feature of the invention, the load securement device 140 is easily placed in its set condition by a simple axial sliding movement of the slide member 144 within the tubular housing 142, and is automatically locked in this set position. A lock pin 152 is supported for transverse sliding movement in a corresponding opening 154 extending through the slide member 144. A spring 156 (FIGS. 13 and 14) disposed within a cavity 158 in the slide member 144 bears against a spring retainer 160 on the lock pin 152. The spring 156 continually urges the lock pin toward a locked position (FIG. 13) wherein a stop member 162 engages the wall of the cavity 158.

The wall of the tubular housing 142 is provided with a lock aperture 164 sized to receive a first end 166 of the lock pin 152. When the slide member 144 is moved to the set position, the pin end 166 is moved into the aperture 164 by the spring 156 securely and automatically to lock the device 140 in the set condition.

Another feature of the present invention resides in the provision of structure permitting easy and convenient release of the device 140 from the set condition. The housing 142 is provided with a pair of flanges 168 supporting a pivot pin 170 upon which is mounted a release lever 172. Lever 172 includes an operating portion 174 having a protrusion or nose 176 aligned with the lock aperture 164 and protruding a distance approximately equal to the wall thickness of the housing 142. A keeper portion 178 of the release lever 172 limits the rotation of the lever 172 about the pin 170 and maintains the lever portion 174 adjacent the aperture 164.

In order to slacken the band 36 or other load securement element maintained in tension by the device 140, the release lever 172 is rotated in the clockwise direction as viewed in the drawings to move the lock pin 152 from the aperture 164. This may be accomplished by striking the lever portion 174 with a hammer or other tool. When the end 166 of the lock pin 152 is moved clear of the aperture 164 by the nose 176, the tension in the band 36 or other securement element causes the slide member 144 to move away from the set position and toward the released position.

The released position of the device 140 is illustrated in FIG. 11 and in broken lines in FIG. 13. In order to prevent the slide member 144 from being removed from the housing 142, there are provided a pair of stop pins or rods 180 held by retaining pins 182 and engaged by the slide member 144 in its released position.

In accordance with the invention, the lock pin 152 cooperates with the housing 142 not only automatically to lock the device 140 in the set position, but also to guide the sliding movement of the slide member 144 between positions. The housing 142 is provided with an elongated slot or recess 184 (FIGS. 13 and 14) generally diametrically opposed from the lock aperture 164 and aligned with a second end 186 of the lock pin 152. When the lock pin is moved from the aperture 164 and when the slide member 144 leaves the set position, the end 166 of the lock pin bears against the inside wall of the housing 142 while the ends 186 enter the guide recess 100. As the slide member 144 moves between the set and released positions, it is guided in its sliding motion so that it cannot rotate and so that the end 166 of the lock pin 152 remains in alignment with the lock aperture 164.

In the use of the quick release securement device 140, it is desirable that a person installing the device be able readily to determine whether or not the device is in its set condition. In accordance with a feature of the present invention, there is provided an easily perceived visual indication of the condition of the device 140.

More specifically, and as best seen in FIGS. 10 and 11, the housing 142 includes a pair of oppositely directed windows 188 aligned with the slide member 144 when the device 140 is in the set condition. As indicated by the color lining in FIG. 10, the outer peripheral surface 190 of the slide member 144 is brightly colored in yellow so that a visual indication of the set condition is easily seen through the windows 188.

When the slide member 144 is not in the set condition (FIG. 11) the yellow surface 190 is not visible through the windows 188, and this provides an indication that the device is not in the set condition. As best seen in FIG. 11, a further indication is provided by brightly coloring the shank 192 of the eye bolt 150 in red as indicated by color lining. Since the shank 192 is hidden within the housing 142 in the set condition of the device 140 (FIG. 10), and extends from the housing in the released condition (FIG. 11), the brightly colored red shank provides an easily perceived indication of the released condition of the device 140.

While the invention has been described with reference to the details of the illustrated embodiments, such details are not intended to limit the scope of the invention as defined in the following claims.

What is claimed and desired to be secured by Letters Patent of the United States is:

1. A load securement system for securing a load to a vehicle including:

an elongated load securement element engaged with the load;

anchor means on the vehicle;

a quick release load securement device having first and second attachment structures for connection of the device between the anchor means and the load securement element;

said load securement device being operable between set and released conditions wherein the spacing between said attachment structures is changed to apply tension to and release the tension in said elongated load securement element;

and the improvement in accordance with which said device is characterized by:

an elongated generally tubular housing;

a slide member slidable axially in said housing between the set and released positions;

said first and second attachment structures being connected respectively to said housing and said slide member and extending from opposite ends of said housing;

an opening extending transversely entirely through said slide member;

a lock pin supported in said slide member opening for transverse movement;

the wall of said tubular housing including a lock aperture receiving a first end of the lock pin when the slide member is in the set position;

spring means in said slide member opening for biasing said lock pin toward said lock aperture;

a release element supported on said housing and having a portion movable into said lock aperture for moving the lock pin out of the aperture; and an elongated slot in the wall of said tubular housing opposite said lock aperture;

said lock pin being longer than the distance between said aperture and said slot, where a second end of said pin is received in said slot for guiding the sliding movement of said slide member in said housing when the lock pin is moved out of the aperture.

2. A load securement system as claimed in claim 1 further comprising a bright colored surface covering at least a portion of said slide member, and a window in said housing aligned with said bright colored surface when said slide member is in said set position.

3. A load securement system as claimed in claim 1 further comprising resilient elastomeric means adjacent a first surface of said slide member; compression means disposed on the side of said elastomeric means opposite said slide member; and said second attachment structure connected to said compression means and extending from the second surface of said slide member to the exterior of said housing.

4. A load securement system as claimed in claim 3 further comprising a pair of axially spaced peripheral surfaces on said slide member respectively brightly colored with different colors, and means including wall means of said housing and spaced window means in said wall means for revealing only one said peripheral surface in the set position of said slide member and for revealing only the other said peripheral surface in the released position of said slide member.

5. A load securement system as claimed in claim 1, further comprising a pivot pin supported on said housing at a location axially spaced from said aperture, and a release lever pivotally mounted on said pivot pin and including a projection aligned with said aperture for moving said lock pin from said aperture upon rotation of said release lever.

6. A load securement system as claimed in claim 5, further comprising a pair of spaced apart flanges formed on the exterior of said tubular housing, said pivot pin extending between said flanges.

7. A load securement system as claimed in claim 6, said lever including a keeper portion extending from said pivot pin away from said aperture and engageable with said housing when said projection pivots away from said aperture to limit rotation of said lever.

* * * * *